(12) United States Patent
     Park et al.

(10) Patent No.: US 10,649,091 B2
(45) Date of Patent: May 12, 2020

(54) METHOD AND SYSTEM FOR TIME TO FIRST FIX (TTFF) REDUCTION OF GPS RECEIVERS USING SATELLITE BASED AUGMENTATION SYSTEM (SBAS) SIGNAL

(71) Applicant: KOREA AEROSPACE RESEARCH INSTITUTE, Daejeon (KR)

(72) Inventors: Jae Ik Park, Daejeon (KR); Eun Sung Lee, Daejeon (KR); Moon Beom Heo, Daejeon (KR); Gi Wook Nam, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 326 days.

(21) Appl. No.: 15/819,926

(22) Filed: Nov. 21, 2017

(65) Prior Publication Data

US 2018/0143325 A1    May 24, 2018

(30) Foreign Application Priority Data

Nov. 23, 2016   (KR) .......................... 10-2016-0156815
Oct. 20, 2017   (KR) .......................... 10-2016-0136795

(51) Int. Cl.
*G01S 19/07* (2010.01)
*G01S 19/02* (2010.01)
(Continued)

(52) U.S. Cl.
CPC .............. *G01S 19/07* (2013.01); *G01S 19/02* (2013.01); *G01S 19/05* (2013.01); *G01S 19/27* (2013.01)

(58) Field of Classification Search
CPC .......... G01S 19/07; G01S 19/02; G01S 19/05; G01S 19/27; G01S 19/08; B60R 25/04; B60R 25/102; B60R 25/104
(Continued)

(56) References Cited

U.S. PATENT DOCUMENTS

| 6,058,338 A | 5/2000 | Agashe et al. |
| 2009/0251365 A1* | 10/2009 | Suzuki .................... G01S 19/07 342/357.24 |

(Continued)

FOREIGN PATENT DOCUMENTS

| JP | 2008-145363 A | 6/2008 |
| KR | 10-2010-0129543 A | 12/2010 |

OTHER PUBLICATIONS

Takeyasu Sakai et al., "Expanding SBAS Service Area Toward the Southern Hemisphere", 25th International Technical Meeting of the Satellite Division of The Institute of Navigation, Nashville TN, Sep. 17-21, 2012, pp. 1377-1388.

(Continued)

*Primary Examiner* — Harry K Liu
(74) *Attorney, Agent, or Firm* — Rabin & Berdo, P.C.

(57) ABSTRACT

A Global Positioning System (GPS) receiver, a control method of the GPS receiver, and a GPS system are provided, which are capable of reducing an initial position check time using an SBAS signal transmitted from a SBAS satellite. The control method of a GPS receiver includes receiving an SBAS signal from a SBAS satellite and calculating a satellite clock and a satellite position of the GPS receiver using the received SBAS signal. The SBAS signal may contain a difference value between the ephemeris data and the almanac data of the GPS satellite. The difference value between the ephemeris data and the almanac data may include a satellite clock difference value and a satellite position difference value for the GPS satellite. Accordingly, it is possible to acquire the current position and time information more quickly and accurately, by shortening the initial position check time using the difference value between the ephemeris data and the almanac data included in the SBAS signal.

9 Claims, 2 Drawing Sheets

(51) Int. Cl.
*G01S 19/27* (2010.01)
*G01S 19/05* (2010.01)

(58) Field of Classification Search
USPC .................................................. 342/357.395
See application file for complete search history.

(56) References Cited

U.S. PATENT DOCUMENTS

| 2010/0090888 A1* | 4/2010 | Kangas | G01S 19/07 |
| | | | 342/357.46 |
| 2010/0231443 A1* | 9/2010 | Whitehead | G01S 19/07 |
| | | | 342/357.23 |
| 2015/0077288 A1* | 3/2015 | Rao | G01S 19/05 |
| | | | 342/357.51 |

OTHER PUBLICATIONS

Takeyasu Sakai, "Transmitting Orbital Parameters to Reduce Time to First Fix of GPS", Journal of Institute of Electronics, Information and Communication Science B, 2008, pp. 479-486, vol. J91-B.

* cited by examiner

METHOD AND SYSTEM FOR TIME TO FIRST FIX (TTFF) REDUCTION OF GPS RECEIVERS USING SATELLITE BASED AUGMENTATION SYSTEM (SBAS) SIGNAL

BACKGROUND

Technical Field

The present disclosure relates to a Global Positioning System (GPS) receiver, a control method of the GPS receiver, and a GPS system, and more particularly, to a GPS receiver, a control method of the GPS receiver, and a GPS system, which are capable of reducing an initial position check time using a Satellite Based Augmentation System (SBAS) signal transmitted from a SBAS satellite.

Background Art

Generally, Unmanned Aerial Vehicle (UAV), sometimes called a "drone", refers to an aircraft that is capable of flying without a pilot aboard according to a pre-programmed program to perform a designated mission, or autonomously flying while recognizing by itself the environment (e.g., obstacle or route).

Unlike general aircraft, the UAVs do not have space for pilots or safety devices for the purpose of compactness and lightweight, and they are widely used for information gathering and reconnaissance in places where human access is difficult. For example, UAVs are used for various purposes such as meteorological observations, acquisition of aerial imaging of catastrophe and disaster areas that are difficult to access, power line inspections, and so on.

In order to fly the UAV, navigation equipment including an inertial navigation system for attitude control and a Global Positioning System (GPS) for guiding the route is necessary. UAV may use GPS to determine the current position, and conventionally, there is a problem that the Time to First Fix (TTFF), which is the time required at the initial take-off of the UAV for receiving the GPS signal and determining the current position, is lengthened.

The GPS receiver determines in advance which satellite signals can be received based on the latest almanac data, and receives ephemeris data from one of the satellites receiving the latest ephemeris data to establish a clock synchronization with the satellites, and receives the signal from the three or more other satellites to measure the distance to each satellite and determine its own position.

The TTFF may vary by Factory Start, Cold Start, Warm Start, Hot Start, and so on, depending on whether or not the almanac data and the ephemeris data are received after the GPS receiver is turned on. Among these, except for the case of Hot Start in which the GPS receiver is used again within a few minutes after turn-off, or the GPS receiver is temporarily unable to receive GPS satellite signals due to obstacles (buildings, tunnels, etc.), TTFF generally takes about 30 seconds to 15 minutes when it is necessary to receive the almanac data and the ephemeris data.

Thus, there is a problem that the time until the UAV is operated is significantly delayed due to the TTFF.

Therefore, it is essential to develop a technique to shorten the initial position check time by using the difference value between the ephemeris data and the almanac data included in the SBAS signal, in order to reduce the operation time of the UAV and to quickly determine the location of the UAV in the event of an emergency. Also, in addition to UAVs, it is essential to develop associated technologies in areas where it is necessary to shorten the time to determine the current position upon GPS receiver turn-on.

SUMMARY

Accordingly, it is an object of the present disclosure to provide a GPS receiver, a control method of the GPS receiver, and a GPS system, which may quickly and accurately acquire current position and time information by shortening an initial position check time using an SBAS signal including a difference value between ephemeris data and almanac data.

Further, in addition to the objects explicitly mentioned, the present disclosure includes other objects that may be achieved from the configuration of the present disclosure described below.

In order to achieve the technical objects mentioned above, a control method of a GPS receiver according to an embodiment of the present invention may include receiving an SBAS signal from a SBAS satellite and calculating a satellite clock and a satellite position of the GPS receiver using the received SBAS signal.

The SBAS signal may contain a difference value between the ephemeris data and the almanac data of the GPS satellite.

The difference value between the ephemeris data and the almanac data may include a satellite clock difference value and a satellite position difference value for the GPS satellite.

The satellite clock difference value between the ephemeris data and almanac data for the GPS satellite may be calculated by $$\Delta T^j(t_0) = T_E^j(t_0) - T_A^j(t_0) \quad \text{[Equation 1]}$$

The satellite position difference value between the ephemeris data and almanac data for the GPS satellite may be calculated by $$\Delta x^j(t_0) = x_E^j(t_0) - x_A^j(t_0) \quad \text{[Equation 2]}$$

where, $t_0$ is the time of calculating the satellite clock difference value at a ground station, $\Delta T^j(t_0)$ is the satellite clock difference value calculated at time $t_0$ at the ground station for j-th GPS satellite among a plurality of GPS satellites, $T_E^j(t_0)$ is the satellite clock ephemeris data of the j-th GPS satellite, $T_A^j(t_0)$ is the satellite clock almanac data of the j-th GPS satellite, $\Delta x^j(t_0)$ is the satellite position difference value calculated at time $t_0$ at the ground station for the j-th GPS satellite among the plurality of GPS satellites, $x_E^j(t_0)$ is the satellite position ephemeris data of the j-th GPS satellite, and $x_A^j(t_0)$ is the satellite position almanac data of the j-th GPS satellite.

The satellite clock ephemeris data of the GPS satellite may be calculated by $$\tilde{T}_E^j(t) = T_A^j(t) + \Delta T^j(t_0) \quad \text{[Equation 3]}$$

The satellite position ephemeris data of the GPS satellite may be calculated by $$\tilde{x}_E^j(t) = x_A^j(t) + \Delta x^j(t_0) \quad \text{[Equation 4]}$$

where, t is the time of calculating the satellite clock ephemeris data at a GPS receiver, $\tilde{T}_E^j(t)$ is the satellite clock ephemeris data calculated at time t for a j-th GPS satellite, $T_A^j(t)$ is the satellite clock almanac data already maintained in the GPS receiver at time t for the j-th GPS satellite, $\Delta T^h(t_0)$ is the satellite clock difference value between the ephemeris data and the almanac data acquired from a SBAS message for the j-th GPS satellite, $\tilde{x}_E^j(t)$ is the satellite position ephemeris data calculated at time t for the j-th GPS satellite, $x_A^j(t)$ is the satellite position almanac data already maintained in the GPS receiver at time t for the j-th GPS satellite, $\Delta x^j(t_0)$ is the satellite position difference value between the ephemeris data and almanac data acquired from the SBAS message for the j-th GPS satellite, and $t_0$ is the time of calculating the satellite position difference value at the ground station.

The SBAS signal may include a difference value in the position and a difference value in a time correction value for 4 or more GPS satellites, by 50 bits per second or less.

The GPS receiver according to another embodiment of the present disclosure may include a receiver configured to receive the SBAS signal from the SBAS satellite and a controller configured to calculate the satellite clock and satellite position of the GPS satellite using the received SBAS signal.

The ground station according to another embodiment of the present disclosure calculates a difference value between ephemeris data and almanac data of the GPS satellite, and includes the calculated difference value in a SBAS message and transmit the same to the SBAS satellite.

According to the present disclosure, there is an advantage that the GPS receiver may acquire the current position and time information more quickly and accurately, thereby enabling quick operation, since the initial position check time is shortened by using the difference value between the ephemeris data and the almanac data included in the SBAS signal. In addition, there is no need for a separate receiver since the GPS receiver may receive the SBAS signal and there is also no space constraint since the present disclosure may be used in all the spaces where the SBAS signal may reach.

In addition, it is possible to acquire the current position and time information required in the field of UAVs for the initial takeoff quickly and accurately through the use of SBAS signal, and precision control the UAV is enabled. In addition, the present disclosure may be applied in various fields in which position and time information are required. Meanwhile, the effects of the present disclosure are not limited to those described above, and other effects that may be derived from the constitution of the present disclosure described below are also included in the effects of the present disclosure.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Hereinafter, embodiments of the present disclosure will be described in detail with reference to the accompanying drawings so that those skilled in the art can easily carry out the present disclosure.

Figure 1:
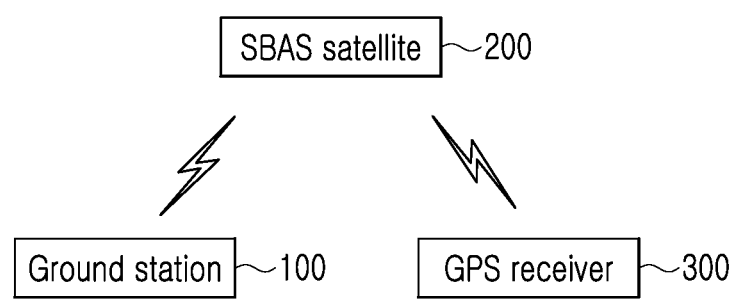
FIG. 1 is a schematic block diagram of a GPS system according to an embodiment of the present disclosure.

FIG. 1 shows a schematic diagram of a GPS system according to an embodiment of the present disclosure.

As shown in FIG. 1, the GPS system 1 includes a ground station 100, an SBAS satellite 200, and a GPS receiver 300.

The ground station 100 may include a reference station (not illustrated), a central station (not illustrated), a satellite communication station (not illustrated), and so on. Specifically, GPS signals may respectively be received from the reference stations distributed over a wide area and navigation data and distance measurements may be generated and transmitted to the central station. The central station may use the information collected from the reference stations to generate correction information for correcting the orbit, clock error and ionospheric delay error for GPS satellite to be used for the position calculation at the GPS receiver 300, and generate integrity information for determining presence/absence of abnormality in the GPS signal, or the like. The correction information and the integrity information generated at the central station may be included in the SBAS message and transmitted to the satellite communication station. The satellite communication station may then transmit the SBAS signal including the SBAS message to the SBAS satellite 200.

In this example, the SBAS (Satellite Based Augmentation System) refers to a satellite-based correction system that corrects GPS signal errors and provides accurate position information through geostationary satellites. The SBAS may correct GPS error at about 1 m-level.

The ground station 100 may calculate respective difference values between ephemeris data and almanac data for a plurality of GPS satellites (not illustrated). The ground station 100 may then include the calculated difference values between the ephemeris data and the almanac data of the GPS satellite in the SBAS message and transmit it to the SBAS satellite 200.

The ephemeris data of the GPS satellite represents very precise orbit and clock correction information of the GPS satellite and may be updated approximately every 5 hours. The GPS satellite completes transmission of the ephemeris data in approximately 30 seconds and continues retransmitting it.

The almanac data of the GPS satellite represents the approximate orbital parameter information of the GPS satellite and may be updated once in a few months. The GPS satellite completes transmission of the almanac data in approximately 30 seconds and continues retransmitting it.

The ground station 100 may receive the ephemeris data and the almanac data from the GPS satellite and calculate the difference value between the ephemeris data and the almanac data of the corresponding GPS satellite based on the received data.

The difference value between the ephemeris data and the almanac data of the GPS satellite may include the satellite clock difference value and the satellite position difference value.

The satellite clock difference values between the ephemeris data and the almanac data of the GPS satellite may be calculated by Equation 1 below.

$$\Delta T^j(t_0) = T_E^j(t_0) - T_A^j(t_0) \qquad \text{[Equation 1]}$$

where, $t_0$ is the time of calculating the satellite clock difference value at the ground station, $\Delta T^j(t_0)$ is the satellite clock difference value calculated at time $t_0$ at the ground station for the j-th GPS satellite among a plurality of GPS satellites, $T_E^j(t_0)$ is the satellite clock ephemeris data of the j-th GPS satellite, and $T_A^j(t_0)$ is the satellite clock almanac data of the j-th GPS satellite.

The satellite position difference value between the ephemeris data and the almanac data of the GPS satellite may be calculated by Equation 2 below.

$$\Delta x^j(t_0) = x_E^j(t_0) - x_A^j(t_0) \quad \text{[Equation 2]}$$

where, $t_0$ is the time of calculating the satellite clock difference value at the ground is station, $\Delta x^j(t_0)$ is a satellite position difference value calculated at time $t_0$ at the ground station for the j-th GPS satellite among a plurality of GPS satellites, $x_E^j(t_0)$ is the satellite position ephemeris data of the j-th GPS satellite, and $x_A^j(t_0)$ is the satellite position almanac data of the j-th GPS satellite.

The SBAS satellite 200 may include an SBAS message, including the difference value between the ephemeris data and the almanac data of the GPS satellite transmitted from the ground station 100, in SBAS signal, and transmit the SBAS message to the GPS receiver 300 in the service area.

The GPS receiver 300 may accurately determine its own position by using the GPS signal received from the GPS satellite and the SBAS signal received from the SBAS satellite 200.

In particular, the GPS receiver 300 according to the present disclosure may calculate its own position even before acquiring the ephemeris data and the almanac data, by receiving the GPS signal from the GPS satellite upon turn-on.

The GPS receiver 300 may acquire the difference value between the ephemeris data and the almanac data of the GPS satellite from the SBAS signal. The GPS receiver 300 may acquire the ephemeris data of the GPS satellite by applying the difference value between the acquired ephemeris data and the almanac data to the previously stored almanac data. This will be described in detail below.

Figure 2:
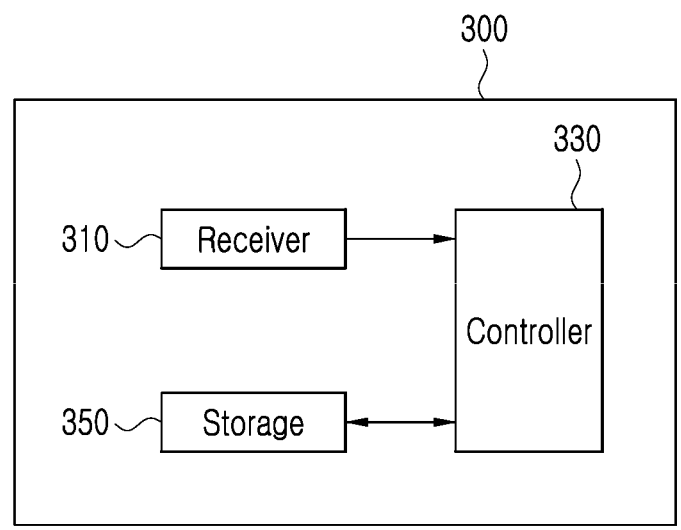
FIG. 2 is a detailed block diagram of the GPS receiver shown in FIG. 1.

FIG. 2 is a diagram showing a detailed configuration of the GPS receiver illustrated in FIG. 1.

The GPS receiver 300 may include a receiver 310, a controller 330 and a storage 350.

The receiver 310 may receive the SBAS signal from the SBAS satellite 200 through the antenna.

The controller 330 may calculate the satellite clock ephemeris data and the satellite position ephemeris data of the GPS satellite using the received SBAS signal. The information previously stored at the GPS receiver 300 may be used for the almanac data.

More specifically, the controller 330 may calculate the satellite clock information and the satellite position information of the corresponding GPS satellite, using the difference value between the ephemeris data and the almanac data of the GPS satellite included in the SBAS message.

Equation 3 below shows the calculation of the satellite clock ephemeris data of the GPS satellite at the GPS receiver 300.

$$\tilde{T}_E^j(t) = T_A^j(t) + \Delta T^j(t_0) \quad \text{[Equation 3]}$$

where, t is the time of calculating the satellite clock ephemeris data at the GPS receiver, $\tilde{T}_E^j(t)$ is the satellite clock ephemeris data calculated at time t for the j-th GPS satellite, $T_A^j(t)$ is the satellite clock almanac data already maintained in the GPS receiver at time t for the j-th GPS satellite, $\Delta T^j(t_0)$ is the satellite clock difference value between the ephemeris data and the almanac data acquired from the SBAS message for the j-th GPS satellite, and $t_0$ is the time of calculating the satellite clock difference value at the ground station.

Equation 4 below shows the calculation of the satellite position ephemeris data of the GPS satellite at the GPS receiver 300.

$$\tilde{x}_E^j(t) = x_A^j(t) + \Delta x^j(t_0) \quad \text{[Equation 4]}$$

where, t is the time of calculating the satellite position ephemeris data at the GPS receiver, $\tilde{x}_E^j(t)$ is the satellite position ephemeris data calculated at time t for the j-th GPS satellite, $x_A^j(t)$ is the satellite position almanac data already maintained in the GPS receiver at time t for the j-th GPS satellite, $\Delta x^j(t_0)$ is the satellite position difference value between the ephemeris data and the almanac data acquired from the SBAS message for the j-th GPS satellite, and $t_0$ is the time of calculating the satellite position difference value at the ground station.

The controller 330 may calculate the current position and time information of the GPS receiver 300 using the satellite clock ephemeris data and the satellite position ephemeris data of the GPS receiver calculated in the manner described above.

The controller 330 may store the calculated current position and time information of the GPS receiver 300 in the storage 350 or may transmit it to a device (e.g., control means of UAV) connected to the GPS receiver 300.

The storage 350 may store the almanac data received from the GPS satellite and provide the almanac data when the controller 330 calculates the ephemeris data using the difference value included in the SBAS signal.

Meanwhile, it is possible to include, by 50 bits per second or less, the difference values between the ephemeris data and the almanac data for 4 to 5 or more GPS satellites in the SBAS message and provide the SBAS message.

More specifically, the transmission rate of the SBAS signal transmitted from the SBAS satellite 200 (i.e., transmission rate of the SBAS message) is 250 bits per second, and the data field excluding the preamble and the message ID is 212 bits. In the current standard SBAS message format, the capacity available for the difference values between ephemeris data and almanac data for the GPS satellites is 50 bits per second. By loading the difference values between the ephemeris data and the almanac data of the four or more GPS satellites on one SBAS message, which can be transmitted every 5 seconds, it is possible to shorten the initial position check time to about 5 seconds.

The technique for shortening the initial position check time may be applied to the field of UAVs or all technical fields associated with providing position and time information using a GPS receiver. In the field of UAVs, because the position and time information required at the initial take-off can be acquired quickly and accurately through the SBAS signal, precision control of UAVs is enabled, and the performance of various functions requiring the position and time information such as Ready to Fly Mode, Return Home or Waypoint, and so on can also be enhanced.

In addition, other science fields of providing position information are also applicable. For example, position information is necessary for investigating moving marine ecosystems such as whales, and so on, but since the position information may not be obtained when the whale submerged in the sea, the position information should be acquired for the time of about 30 seconds until the whales reappear on the surface of the water and the acquired position should be transmitted.

Therefore, if it is possible to shorten the initial position check time and shorten the position information acquisition time, it will be possible to track the movement of the whales more precisely and conduct accurate ecological investigation.

Hereinafter, a control method of a control system will be described according to an embodiment of the present disclosure.

Figure 3:
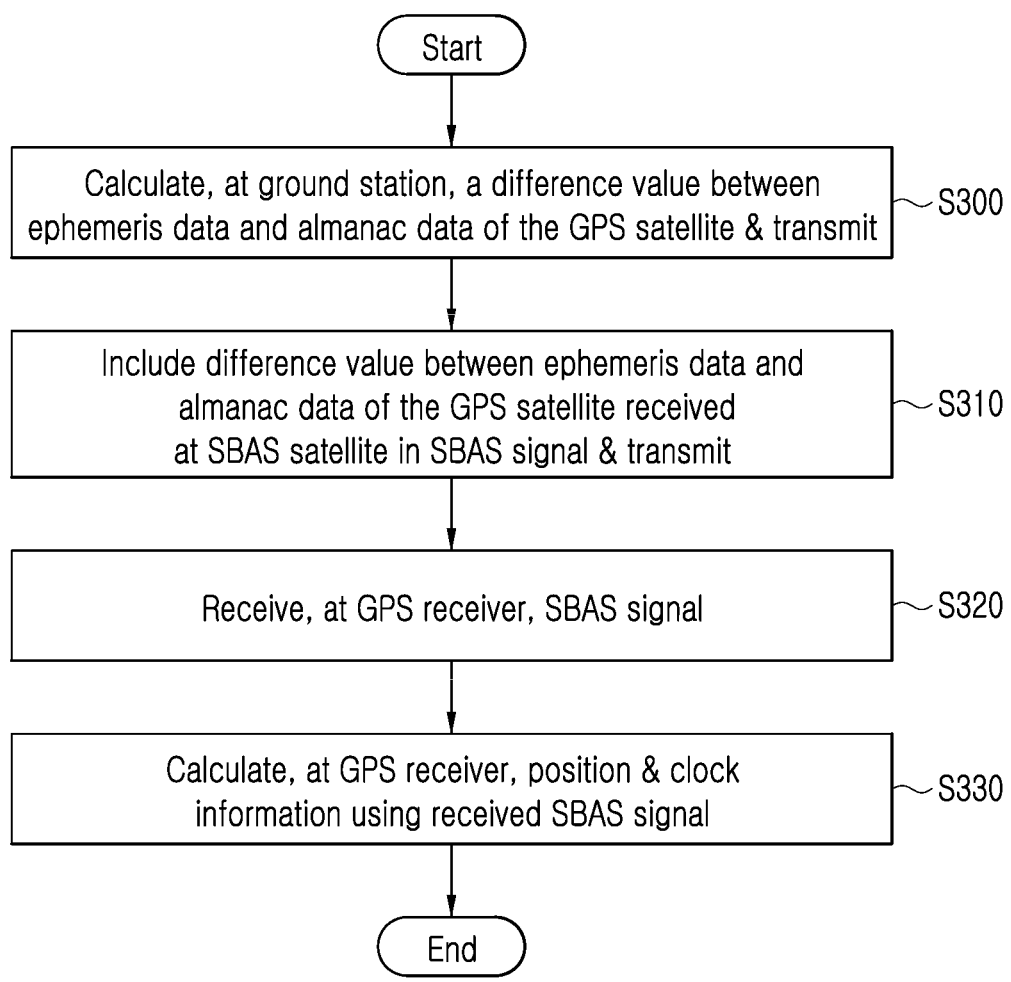
FIG. 3 is a view provided to explain an operation process of the GPS system according to an embodiment of the present disclosure.

FIG. 3 is a view provided to explain an operation procedure of a GPS system according to an embodiment of the present disclosure.

As illustrated in FIG. 3, the ground station may calculate and transmit the difference value between the ephemeris data and the almanac data of the GPS satellite to the SBAS satellite, at S300.

More specifically, the ground station may calculate the difference value between the ephemeris data and the almanac data of the GPS satellite based on the GPS satellite information generated from its constant observation on the GPS signal and include the calculated result in the SBAS message and transmit this to the SBAS satellite.

At S300, the ground station may include, by 50 bits per second or less, the difference value between the ephemeris data and the almanac data for 4 to 5 or less GPS satellites in the data field of the SBAS message and transmit the SBAS message.

The SBAS satellite may then include the SBAS signal including the difference value between the ephemeris data and the almanac data of the GPS satellite in the SBAS signal and transmit the SBAS signal, at S310.

The GPS receiver may then receive the SBAS message including the difference value between the ephemeris data and the almanac data of the GPS receiver from the SBAS satellite, at S320. The operation at S320 may be performed upon the GPS receiver being turned on, before receiving the GPS signal from the GPS satellite to acquire the ephemeris data.

The GPS receiver may then acquire the ephemeris data of the GPS satellite using Equation 3 or 4 described above, using the difference value between the ephemeris data and the almanac data included in the received SBAS message, and may calculate its position and time information using the acquired data, at S330.

Embodiments of the present disclosure include a computer-readable medium including program instructions for performing various computer-implemented operations. The medium records a program for executing the GPS receiving method described above. The medium may include program instructions, data files, data structures, etc., alone or in combination. Examples of such medium include magnetic medium such as hard disks, floppy disks and magnetic tape, optical recording medium such as CD and DVD, floptical disk and magneto-optical medium, hardware devices configured to store and execute program instructions, such as ROM, RAM, flash memory, etc. Examples of program instructions include machine language codes such as those generated by a compiler, as well as high-level language codes that may be executed by a computer using an interpreter, and so on.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A control method of a Global Positioning System (GPS) receiver, comprising:
  receiving a Satellite Based Augmentation System (SBAS) signal from a SBAS satellite; and
  calculating a satellite clock and a satellite position of a GPS satellite using the received SBAS signal,
  wherein the SBAS signal comprises a difference value between ephemeris data and almanac data of the GPS satellite,
  wherein the difference value between the ephemeris data and the almanac data comprises a satellite clock difference value and a satellite position difference value for the GPS satellite,
  wherein the satellite clock difference value between the ephemeris data and almanac data for the GPS satellite is calculated by:

$$\Delta T^j(t_0) = T_E^j(t_0) - T_A^j(t_0) \quad \text{[Equation 1]}$$

and the satellite position difference value between the ephemeris data and almanac data for the GPS satellite is calculated by:

$$\Delta x^j(t_0) = x_E^j(t_0) - x_A^j(t_0) \quad \text{[Equation 2]}$$

where $t_0$ is the time of calculating the satellite clock difference value at a ground station, $\Delta T^j(t_0)$ is the satellite clock difference value calculated at time $t_0$ at the ground station for j-th GPS satellite among a plurality of GPS satellites, $T_E^j(t_0)$ is the satellite clock ephemeris data of the j-th GPS satellite, $T_A^j(t_0)$ is the satellite clock almanac data of the j-th GPS satellite, $\Delta x^j(t_0)$ is the satellite position difference value calculated at time $t_0$ at the ground station for the j-th GPS satellite among the plurality of GPS satellites, $x_E^j(t_0)$ is the satellite position ephemeris data of the j-th GPS satellite, and $x_A^j(t_0)$ is the satellite position almanac data of the j-th GPS satellite.

2. The control method of claim 1, wherein the calculating the satellite clock and satellite position of the GPS satellite using the received SBAS signal comprises calculating the satellite clock ephemeris data of the GPS satellite by:

$$\tilde{T}_E^j(t) = T_A^j(t) + \Delta T^j(t_0) \quad \text{[Equation 3]}$$

and calculating the satellite position ephemeris data of the GPS satellite by:

$$\tilde{x}_E^j(t) = x_A^j(t) + \Delta x^j(t_0) \quad \text{[Equation 4]}$$

where, t is the time of calculating the satellite clock ephemeris data at a GPS receiver, $\tilde{T}_E^j(t_0)$ is the satellite clock ephemeris data calculated at time t for a j-th GPS satellite, $T_A^j(t_0)$ is the satellite clock almanac data already maintained in the GPS receiver at time t for the j-th GPS satellite, $\Delta T^j(t_0)$ is the satellite clock difference value between the ephemeris data and the almanac data acquired from a SBAS message for the j-th GPS satellite, $\tilde{x}_E^j(t)$ is the satellite position ephemeris data calculated at time t for the j-th GPS satellite, $x_A^j(t_0)$ is the satellite position almanac data already maintained in the GPS receiver at time t for the j-th GPS satellite, $\Delta x^j(t_0)$ is the satellite position difference value between the ephemeris data and almanac data acquired from the SBAS message for the j-th GPS satellite, and $t_0$ is the time of calculating the satellite position difference value at the ground station.

3. The control method of claim 1, wherein the SBAS signal comprises a difference value in the position, and a difference value in a time correction value, for 4 or more GPS satellites, by 50 bits per second or less.

4. A GPS receiver, comprising:
  a receiver configured to receive a SBAS signal from a SBAS satellite; and a controller configured to calculate a satellite clock and a satellite position of a GPS satellite using the received SBAS signal, wherein the SBAS signal comprises a difference value between ephemeris data and almanac data of the GPS satellite, wherein the difference value between the ephemeris data and the almanac data comprises a satellite clock difference value and a satellite position difference value for the GPS satellite, wherein the satellite clock difference value between the ephemeris data and almanac data for the GPS satellite is calculated by:

$$\Delta T^j(t_0) = T_E^j(t_0) - T_A^j(t_0) \qquad \text{[Equation 1]}$$

and the satellite position difference value between the ephemeris data and almanac data for the GPS satellite is calculated by:

$$\Delta x^j(t_0) = x_E^j(t_0) - x_A^j(t_0) \qquad \text{[Equation 2]}$$

where $t_0$ is the time of calculating the satellite clock difference value at a ground station, $\Delta T^j(t_0)$ is the satellite clock difference value calculated at time $t_0$ at the ground station for j-th GPS satellite among a plurality of GPS satellites, $T_E^j(t_0)$ is the satellite clock ephemeris data of the j-th GPS satellite, $T_A^j(t_0)$ is the satellite clock almanac data of the j-th GPS satellite, $\Delta x^j(t_0)$ is the satellite position difference value calculated at time $t_0$ at the ground station for the j-th GPS satellite among the plurality of GPS satellites, $x_E^j(t_0)$ is the satellite position ephemeris data of the j-th GPS satellite, and $x_A^j(t_0)$ is the satellite position almanac data of the j-th GPS satellite.

5. The GPS receiver of claim 4, wherein the controller calculates the satellite clock ephemeris data of the GPS satellite by:

$$\tilde{T}_E^j(t) = T_A^j(t) + \Delta T^j(t_0) \qquad \text{[Equation 3]}$$

and the controller calculates the satellite position ephemeris data of the GPS satellite by:

$$\tilde{x}_E^j(t) = x_A^j(t) + \Delta x^j(t_0) \qquad \text{[Equation 4]}$$

where, t is the time of calculating the satellite clock ephemeris data at a GPS receiver, $\tilde{T}_E^j(t)$ is the satellite clock ephemeris data calculated at time t for a j-th GPS satellite, $T_A^j(t)$ is the satellite clock almanac data already maintained in the GPS receiver at time t for the j-th GPS satellite, $\Delta T^j(t_0)$ is the satellite clock difference value between the ephemeris data and the almanac data acquired from a SBAS message for the j-th GPS satellite, $\tilde{x}_E^j(t)$ is the satellite position ephemeris data calculated at time t for the j-th GPS satellite, $x_A^j(t)$ is the satellite position almanac data already maintained in the GPS receiver at time t for the j-th GPS satellite, $\Delta x^j(t_0)$ is the satellite position difference value between the ephemeris data and almanac data acquired from the SBAS message for the j-th GPS satellite, and $t_0$ is the time of calculating the satellite position difference value at the ground station.

6. The GPS receiver of claim 4, wherein the SBAS signal comprises a difference value in the position, and a difference value in a time correction value, for 4 or more GPS satellites, by 50 bits per second or less.

7. A ground station configured to calculate a difference value between ephemeris data and almanac data of a GPS satellite, and include the calculated difference value in a SBAS message and transmit the same to a SBAS satellite, wherein the difference value between the ephemeris data and the almanac data comprises a satellite clock difference value and a satellite position difference value for the GPS satellite, wherein the satellite clock difference value between the ephemeris data and almanac data for the GPS satellite is calculated by:

$$\Delta T^j(t_0) = T_E^j(t_0) - T_A^j(t_0) \qquad \text{[Equation 1]}$$

and the satellite position difference value between the ephemeris data and almanac data for the GPS satellite is calculated by:

$$\Delta x^j(t_0) = x_E^j(t_0) - x_A^j(t_0) \qquad \text{[Equation 2]}$$

where $t_0$ is the time of calculating the satellite clock difference value at a ground station, $\Delta T^j(t_0)$ is the satellite clock difference value calculated at time $t_0$ at the ground station for j-th GPS satellite among a plurality of GPS satellites, $T_E^j(t_0)$ is the satellite clock ephemeris data of the j-th GPS satellite, $T_A^j(t_0)$ is the satellite clock almanac data of the j-th GPS satellite, $\Delta x^j(t_0)$ is the satellite position difference value calculated at time $t_0$ at the ground station for the j-th GPS satellite among the plurality of GPS satellites, $x_E^j(t_0)$ is the satellite position ephemeris data of the j-th GPS satellite, and $x_A^j(t_0)$ is the satellite position almanac data of the j-th GPS satellite.

8. The ground station of claim 7, wherein the ground station calculates the satellite clock ephemeris data of the GPS satellite by:

$$\tilde{T}_E^j(t) = T_A^j(t) + \Delta T^j(t_0) \qquad \text{[Equation 3]}$$

and calculates the satellite position ephemeris data of the GPS satellite by:

$$\tilde{x}_E^j(t) = x_A^j(t) + \Delta x^j(t_0) \qquad \text{[Equation 4]}$$

where, t is the time of calculating the satellite clock ephemeris data at a GPS receiver, $\tilde{T}_E^j(t)$ is the satellite clock ephemeris data calculated at time t for a j-th GPS satellite, $T_A^j(t)$ is the satellite clock almanac data already maintained in the GPS receiver at time t for the j-th GPS satellite, $\Delta T^j(t_0)$ is the satellite clock difference value between the ephemeris data and the almanac data acquired from a SBAS message for the j-th GPS satellite, $\tilde{x}_E^j(t)$ is the satellite position ephemeris data calculated at time t for the j-th GPS satellite, $x_A^j(t)$ is the satellite position almanac data already maintained in the GPS receiver at time t for the j-th GPS satellite, $\Delta x^j(t_0)$ is the satellite position difference value between the ephemeris data and almanac data acquired from the SBAS message for the j-th GPS satellite, and $t_0$ is the time of calculating the satellite position difference value at the ground station.

9. The ground station of claim 7, wherein the SBAS signal comprises a difference value in the position, and a difference value in a time correction value, for 4 or more GPS satellites, by 50 bits per second or less.

\* \* \* \* \*